US011525086B2

(12) United States Patent
Ruthven et al.

(10) Patent No.: US 11,525,086 B2
(45) Date of Patent: Dec. 13, 2022

(54) PAPER SHEET MULCHES AND METHODS OF MAKING THE SAME

(71) Applicant: GPCP IP Holdings LLC, Atlanta, GA (US)

(72) Inventors: Paul J. Ruthven, Neenah, WI (US); Cary Q. Peterson, Fond du Lac, WI (US); Jeffrey J. Faust, De Pere, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 29 days.

(21) Appl. No.: 17/094,199

(22) Filed: Nov. 10, 2020

(65) Prior Publication Data

US 2021/0062090 A1 Mar. 4, 2021

Related U.S. Application Data

(63) Continuation-in-part of application No. 16/865,925, filed on May 4, 2020.

(60) Provisional application No. 62/843,765, filed on May 6, 2019.

(51) Int. Cl.
| | |
|---|---|
| *D21H 15/02* | (2006.01) |
| *C09K 17/52* | (2006.01) |
| *A01G 13/02* | (2006.01) |
| *D21H 17/12* | (2006.01) |
| *D21H 21/28* | (2006.01) |
| *D21H 21/16* | (2006.01) |
| *D21H 13/08* | (2006.01) |

(52) U.S. Cl.
CPC .......... *C09K 17/52* (2013.01); *A01G 13/0262* (2013.01); *D21H 13/08* (2013.01); *D21H 15/02* (2013.01); *D21H 17/12* (2013.01); *D21H 21/16* (2013.01); *D21H 21/28* (2013.01)

(58) Field of Classification Search
CPC ...... D21H 17/17; D21H 17/675; D21H 15/02; D21H 17/12; D21H 17/68; D21H 13/08; D21H 21/16; D21H 21/28; D21H 17/67; D21H 17/16; D21H 17/375; D21H 21/18; A01G 13/0262; A01G 13/0268; C09K 17/52

USPC .............................................. 47/9; 162/162

See application file for complete search history.

(56) References Cited

U.S. PATENT DOCUMENTS

| | | | |
|---|---|---|---|
| 2,655,978 | A | 10/1953 | Gonda et al. |
| 3,493,464 | A | 2/1970 | Bowers et al. |
| 3,984,433 | A | 10/1976 | Spietschka et al. |
| 5,163,247 | A | 11/1992 | Weber et al. |
| 5,191,734 | A | 3/1993 | Weber et al. |
| 5,419,962 | A | 5/1995 | Robertson et al. |
| 5,672,434 | A | 9/1997 | Dalebroux et al. |
| 5,853,541 | A | 12/1998 | Monroe et al. |
| 5,854,060 | A | 12/1998 | Strickland |
| 5,866,269 | A | 2/1999 | Dalebroux et al. |
| 5,937,573 | A | 8/1999 | Mizuguchi et al. |
| 6,625,923 | B2 | 9/2003 | Lee et al. |
| 8,173,222 | B2 | 5/2012 | Brody et al. |
| 8,778,407 | B2 | 7/2014 | Zhang et al. |
| 9,314,030 | B2 | 4/2016 | Richardson et al. |
| 10,449,691 | B2 | 10/2019 | Brimhall |
| 2005/0241786 | A1 | 11/2005 | Edwards et al. |
| 2006/0243405 | A1 | 11/2006 | Zwick et al. |
| 2009/0277082 | A1 | 11/2009 | Sala et al. |
| 2015/0037865 | A1 | 2/2015 | Weder |
| 2016/0053437 | A1 | 2/2016 | Husband et al. |
| 2016/0326698 | A1 | 11/2016 | Chen et al. |
| 2021/0243964 | A1 | 8/2021 | McAlary et al. |
| 2021/0289719 | A1 | 9/2021 | McAlary et al. |

FOREIGN PATENT DOCUMENTS

| | | |
|---|---|---|
| EP | 0515750 A2 | 12/1992 |
| EP | 2667701 | 3/2015 |
| JP | 2005290583 | 10/2005 |
| JP | 3827240 | 9/2006 |
| KR | 102058392 | 12/2019 |
| WO | WO 2012/101329 | 8/2012 |
| WO | WO 2015006560 | 1/2015 |
| WO | WO 2016/174619 | 3/2016 |
| WO | 2020225729 A2 | 11/2020 |

OTHER PUBLICATIONS

International Search Report and Written Opinion of the International Searching Authority that dated Mar. 26, 2021 in PCT/US2020/059864.
ISA Written Opinion for PCT/IB2020/054257, dated Oct. 29, 2020.
J. Ahokas et al., "Paper based mulches as an alternative to polyethylene mulch in vegetable production," Journal of Agricultural Machinery Science (2014) 10 (1): 73-78.
T. Haapala et al., "Feasibility of paper mulches in crop production: a review," Agricultural and Food Science (2014) 23: 60-79.
S. Kasirajan and M. Ngouajio, "Polyethylene and biodegradable mulches for agricultural applications: a review," Agronomy for Sustainable Development (2012) 32: 501-529.

(Continued)

*Primary Examiner* — Mark Halpern

(57) ABSTRACT

The present disclosure provides novel paper sheet mulch products having benefits over prior sheet mulches, which may include brown or recycled fibers, as well as additives, such as opacity, water-resistant, and strength additives, resulting in mulch products with an improved combination of basis weight, stretch, strength, opacity, and/or water-resistance characteristics.

20 Claims, No Drawings

(56) References Cited

OTHER PUBLICATIONS

A. Korpela et al., "AGRIPAP—Executive Summary", Report identification code: VTT-R-00555-14, 38p (2014).
"Experimentation with 'Agropaper' by Smurfit Kappa and Intia yields good results" (https://www.alimarket.es/envase/noticia/309533/la-experimentacion-con--agropaper--de-smurfit-kappa-e-intia-arroja-buenos-resultados) (Jan. 28, 2020).
International Preliminary Report On Patentability received for PCT Application No. PCT/IB2020/054257, dated Nov. 18, 2021, 10 pages.

PAPER SHEET MULCHES AND METHODS OF MAKING THE SAME

This application is a Continuation-in-Part of U.S. application Ser. No. 16/865,925, filed May 4, 2020, which claims priority to U.S. Provisional Patent Application No. 62/843,765, filed May 6, 2019, each of which are hereby incorporated by reference in their entirety.

TECHNICAL FIELD

The present disclosure relates to sheet mulches made from paper substrates having benefits over prior sheet mulches, including an improved combination of environmental impact, cost, and performance, as well as methods for manufacturing such paper sheet mulches.

BACKGROUND

Mulch is a layer of material applied to the surface of soil for the purpose of improving soil productivity and resultant crop yield. Mulch may be applied either in the form of loose material, such as grass clippings, leaves, bark, wood chips and the like, or in the form of a more structured material, such as a sheet. Benefits of mulches may include one or more of increased soil temperature (which can allow earlier planting and earlier maturation of crops), deterred weed growth (which can reduce mechanical weeding that can disrupt the roots of crop plants), decreased soil compaction (which results in better soil oxygenation for beneficial microbial activity), conserved moisture (by inhibiting evaporation or allowing vaporized and condensed water to fall back onto the soil), reduction in the number of harmful insects (by keeping insects from locating the crop plants), increased efficiency of soil nutrients (by preventing nutrients and fertilizers from leaching below the root zone), and/or reduced fruit/vegetable contact with the soil (which results in cleaner product with less chance of contamination). The extent to which a particular mulch may produce one or more of these benefits depends on the physical properties and material makeup of the mulch.

Recently, synthetic plastic sheet mulches have dominated the market, for example, polyethylene-based sheet mulches. While synthetic sheet mulches have proven effective for improving crop yield, their use also has a number of negative attributes and costs. Synthetic sheet mulches require not only installation of the sheet, but removal of the sheet, which is time consuming and typically involves manual labor, resulting in significant cost to the farmer. The removed synthetic sheet mulch must also be disposed of, which has presented a large environmental problem. The synthetic sheets cannot simply be tilled into the soil, as they will cause contamination and year-to-year accumulation. Synthetic sheet mulches also cannot be burned, as burning releases harmful pollutants. Recycling is typically also not feasible with the high levels of contaminants (e.g., soil, fertilizer, vegetation) and the photodegraded nature of the sheet. Landfilling has thus become the primary accepted practice for disposing of synthetic sheet mulches, but this practice also has significant environmental and economic costs. It has thus been desirable to develop a biodegradable mulch that can replace prior non-degradable synthetic sheet mulches.

To address these concerns, biodegradable and photodegradable plastics have been and are being developed. Introduced in the 1980's, many are not suited to organic farming because they are not entirely composed of constituents derived from natural sources. There is also concern that these materials do not break down completely, leading to accumulation of plastic fragments in the soil and, ultimately, in the oceans. These films are also costly, often 2-3 times the cost of polyethylene-based sheet mulches. It is thus desirable to develop a biodegradable sheet mulch derived from organic, non-plastic materials.

Paper based sheet mulches have been proposed as a possible option. Because they are biodegradable, paper mulches may be tilled into the soil after they have served their purpose, thus greatly reducing disposal costs. To be effective, however, paper mulches must have adequate strength and stretch to withstand the physical abuses throughout their lifecycle, such as during laying and embedding by mechanical equipment, puncturing for planting, and tearing by the action of workers. Paper sheet mulches must also possess an appropriate biodegradation lifespan. If the paper degrades too quickly, it can render the sheet useless.

To date, existing paper sheet mulches have been found to have an unacceptable combination of physical properties, for example the combination of basis weight, strength, and stretch needed to ensure a cost effective product that can withstand the required physical abuse. Prior paper sheet mulches have also been found to have inferior soil temperature, moisture retention, weed control, whether resistance, and/or crop yield properties, particularly compared to synthetic nonbiodegradable sheet mulches. Prior paper mulches have also been found to be costly compared to even biodegradable plastic mulch alternatives.

There is thus a long-felt, but unmet need in the industry to develop a biodegradable paper sheet mulch exhibiting performance attributes comparable to synthetic sheet mulches, but with improved environmental impact, and at a reasonable cost.

The present inventors have developed a novel solution to this problem, having developed a paper sheet mulch product made from a single-ply nonwoven creped paper sheet comprising additives to achieve water resistance and substantially 100% opacity.

SUMMARY OF THE DISCLOSURE

The present inventors have developed novel paper sheet mulch products having benefits over prior sheet mulches, including a combination of improved stretch, strength, opacity, and water-resistance characteristics. In some embodiments, the paper sheet mulch products may comprise brown or recycled fibers. In some embodiments, the paper sheet mulch products may contain one or more opacity modifiers. In some embodiments, the paper sheet mulch products may contain one or more water-resistance additives. In some embodiments, the paper sheet mulch products may contain one or more wet or dry strength additives. In some embodiments, stretch may further be increased in order to withstand the physical stress of use.

DETAILED DESCRIPTION

The base sheet for use in the paper sheet mulch products of the present disclosure may be made from any art recognized cellulosic papermaking fibers. The papermaking fibers may be either bleached, brown, recycled, or a mixture thereof. In some embodiments, the paper sheet mulch product comprises at least about 75% cellulosic papermaking fibers based on the dry weight of the sheet, for example, at least 85%, at least about 90%, or at least about 95%.

In some embodiments, the cellulosic papermaking fibers include at least some fibers having an ISO brightness of less than about 80 in order to reduce cost and increase opacity of the final product. In some embodiments, the papermaking fibers may include those having an ISO brightness of less than about 70 or less than about 60. ISO brightness may be determined according to TAPPI T525. In some embodiments, the paper sheet mulch product may comprise at least about 50% cellulosic papermaking fibers having an ISO brightness less than about 80 based on the dry weight of the sheet, for example at least about 75%, at least about 90%, at least about 95%, or from about 75% to about 100% fibers having an ISO brightness less than about 80 based on the dry weight of the sheet.

In some embodiments, the cellulosic papermaking fibers include at least some recycled fibers, for example mixed recycled fibers (MRF), old newsprint (ONP) fibers, old corrugated container (OCC) fibers, and the like. In some embodiments, the paper sheet mulch product may comprise at least about 50% recycled cellulosic papermaking fibers based on the dry weight of the sheet, for example at least about 75%, at least about 90%, at least about 95%, or from about 75% to about 100% recycled fibers based on the dry weight of the sheet. Without wishing to be bound by theory, it is believed that incorporation of high lignin recycled fibers such as, for example, ONP fibers and/or OCC fibers, may beneficially decrease the rate of biodegradation of the paper sheet. On the other hand, too much lignin can reduce inter-fiber bonding, resulting in a weaker sheet.

In some embodiments, the paper sheet may have a kappa number of at least about 45, at least about 70, at least about 130, or at least about 150, for example from about 45 to about 200, from about 70 to about 180, or from about 130 to about 160 (where kappa number is used as a valuation of lignin content). Kappa number may be determined by Tappi T236.

In some embodiments, the paper sheet mulch product may comprise at least about 30% ONP fibers based on the dry weight of the sheet, for example at least about 50%, or at least about 75%. In addition to slowing biodegradation through increased lignin content, it is also believed that incorporation of ONP fibers may beneficially increase the opacity of the paper sheet mulch product due to the inks and/or pigments used in the newsprint process. In some embodiments, the paper sheet mulch product may comprise at least about 30% OCC fibers based on the dry weight of the sheet, for example at least about 50%, or at least about 75%. In some embodiments, the paper sheet mulch product may comprise at least about 30% MRF fibers based on the dry weight of the sheet, for example at least about 50%, or at least about 75%. In some embodiments, the paper sheet mulch product may comprise a combination of ONP and OCC fibers in an amount of at least about 75% based on the dry weight of the sheet, for example, at least 85%, at least about 90%, or at least about 95% based on the dry weight of the sheet. In some embodiments, the paper sheet mulch product may comprise a combination of MRF and OCC fibers in an amount of at least about 75% based on the dry weight of the sheet, for example, at least 85%, at least about 90%, or at least about 95% based on the dry weight of the sheet. In some embodiments, the paper sheet mulch product may comprise a combination of from about 55% to about 65% OCC fibers and from about 35% to about 45% MRF fibers based on the dry weight of the sheet.

The paper sheet mulch products of the present invention may be manufactured on a non-woven tissue paper-making machine. In a typical process, the fiber is fed into a headbox where it will be admixed with water and chemical additives, as appropriate, before being deposited on a forming wire. The chemical additives for use in the formation of the base sheets can be any known combination of papermaking chemicals. Papermaking chemicals include, for example, one or more of strength agents, softeners, debonders, creping modifiers, sizing agents, optical brightening agents, retention agents, and the like. As used herein "sheet," "web," "tissue," "nascent web," "tissue product," "base sheet" or "tissue sheet," can be used interchangeably to refer to the paper web during various stages of its development. Nascent web, for example, refers to the embryonic web that is deposited on the forming wire. Once the web achieves about 30% solids content, it is referred to as a tissue, or a sheet, or a web. Post-production, the single-ply of tissue is typically called a paper sheet or base sheet.

In some embodiments, the paper sheet mulch products of the present invention may be manufactured using through-air-drying ("TAD") methods. In TAD methods the nascent web is partially dewatered using vacuum suction. Thereafter, the partially dewatered web is dried without compression by passing hot air through the web while it is supported by a through-drying fabric. In some embodiments, the TAD processes use special fabrics or belts to impart a structure to the sheet during drying. While one through-air-drying operation is described above, the system is only exemplary and variations on the described system will be readily apparent to the skilled artisan.

In some embodiments, the paper sheet mulch products of the present invention may be manufactured using conventional wet pressing ("CWP") methods. In conventional wet pressing, the nascent web is transferred to a papermaking felt and is dewatered by passing it between the felt and a press roll under pressure. The web is then pressed by a suction press roll against the surface of a rotating Yankee dryer cylinder that is heated to cause the paper to substantially dry on the cylinder surface. The moisture within the web as it is laid on the Yankee surface causes the web to transfer to the surface. Liquid adhesive may be applied to the surface of the dryer, as necessary, to provide substantial adherence of the web to the surface. The web is then removed from the Yankee surface with a creping blade. The creped web is then passed between calender rollers and rolled up to be used in the downstream production of a paper product. This method of making tissue sheets is commonly referred to as "wet-pressed" because of the compactive method used to dewater the wet web. While one conventional wet pressing operation is described above, the system is only exemplary and variations on the described system will be readily apparent to the skilled artisan.

In some embodiments, the paper sheet may be creped to enhance stretch and bulk, for example creped from a Yankee dryer in a conventional wet pressing process. Creping may be performed by any known type of creping blade. In some embodiments, a non-Taurus (e.g., blue steel) blade is used. In some embodiments, a Taurus crepe blade is used. Without wishing to be bound by theory, it is believed that use of a Taurus blade may increase the stretch of the sheet (for example the cross-direction (CD) stretch), which is believed to improve the handling of the sheet during the mulch laying operation. In some embodiments, the paper-making machine may be run with a speed differential between the Yankee dryer and a rolling reel in order to increase MD stretch. In some embodiments, the sheet may be creped from the Yankee dryer in a wet creping process, wherein the sheet is creped at a moisture level of from about 8% to about 12% of the dry weight of the sheet. In some embodiments, the sheet may be creped from the Yankee dryer in a dry creping process, wherein the sheet is creped at a moisture level of from about 3% to about 5% of the dry weight of the sheet.

In a typical process, after drying, the base sheet is rolled and awaits converting. Converting refers to the process that changes or "converts" base sheets into final products. In some embodiments, wrinkles may be imparted to the sheet during converting, for example with a bowed roll or a roll with annular rings. Without wishing to be bound by theory, it is believed that adding wrinkles to the sheet further increases the stretch or "give" of the sheet. In some embodiments, wrinkles may be added in an orientation fully or partially aligned in the machine direction (the direction the sheet travels in the papermaking machine during formation and processing). Without wishing to be bound by theory, it is believed that adding wrinkles to the sheet that are fully or partially aligned in the machine direction provides particular increase to the cross-direction stretch of the sheet. In some embodiments, the paper sheet has wrinkles in a direction between about 30° and about 90° from the cross-machine direction, for example, between about 60° and about 90°.

In some embodiments, pleated folds may be imparted to the sheet during converting. In some embodiments, folds may be created during a rewinding operation by running the sheet over folding boards or plows to impart one or more folds in the sheet, for example in the form of back-and-forth folds. The sheet may then be directed through one or more pressing nips, for example between calender rolls, to fix the pleated folds into place. Without wishing to be bound by theory, it is believed that creating pleated folds in the sheets provides stress relief points that allow the sheet to relax, rather than tear, particularly during the mulch laying process. In some embodiments, pleated folds may be added in an orientation fully or partially aligned in the machine direction. Without wishing to be bound by theory, it is believed that adding pleated folds to the sheet that are fully or partially aligned in the machine direction provides particular increase to the cross-direction stretch of the sheet. In some embodiments, the paper sheet has pleated folds running in a direction between about 30° and about 90° from the cross-machine direction, for example, between about 60° and about 90°.

In some embodiments, the paper sheet mulch product may be single-ply, comprising only one paper base sheet. In some embodiments, the paper sheet mulch product may be a multi-ply product formed by combining two or more paper base sheets.

In some embodiments, the paper sheet may be treated with an opacity modifier to increase opacity. The opacity modifier may be any additive sufficient to obtain substantially 100% opacity (at least 95% opacity). Opacity may be determined according to TAPPI T425. In some embodiments, the opacity modifier may comprise one or more of carbon black (for example a bio-based carbon black), biochar, pigments or dyes (for example organic and/or inorganic pigments or dyes), fillers (for example clay, kaolin, and titanium oxide), and the like. In some embodiments, the opacity modifier may comprise a black pigment, for example an organic black pigment. In some embodiments, the opacity modifier may comprise a blue pigment, for example an organic blue pigment, or for example blue pigment comprising a phthalocyanine derivative. In some embodiments, the opacity modifier may comprise a blue pigment comprising copper, for example, a blue pigment comprising a phthalocyanine copper complex. Without wishing to be bound by theory, it is believed that the presence of copper may contribute to antimicrobial properties of the sheet, which could improve (slow) the biodegradation rate of the sheet.

In some embodiments, an opacity modifier may be an opacity surface coating. The opacity surface coating may be applied after sheet formation by any known technique, for example, by printing, coating, or spraying. In some embodiments, the opacity modifier may be applied as a coating on both sides of the sheet. In some embodiments, when applied as an opacity surface coating, the opacity modifier may be applied in an amount of from about 0.2 to about 20 lbs/ream based on the dry weight of the sheet, for example, from about 2 to about 10 lbs/ream. In some embodiments, carbon black may be applied as an opacity surface coating in an amount of from about 1 to about 10 lbs/ream based on the dry weight of the sheet, for example, from about from about 2 to about 5 lbs/ream. In some embodiments, biochar may be applied as an opacity surface coating in an amount of from about 2 to about 10 lbs/ream, for example from about 7 to about 10 lbs/ream or from about 8 to about 9 lbs/ream based on the dry weight of the sheet.

In some embodiments, an opacity modifier may be added in the wet-end of the papermaking machine prior to sheet formation. Such addition of the opacity modifier in the wet-end results in a paper sheet mulch wherein the opacity modifier is distributed substantially uniformly throughout the paper sheet mulch product, which does not occur when application is only in the dry-end after sheet formation by, for example, printing, coating, or spraying. In some embodiments, the opacity modifier may be added in the headbox. In some embodiments, the opacity modifier may be added before the headbox, for example at the stuff box, fan pump, or machine chest pump. In some embodiments, an opacity modifier may be added at the suction side of a machine chest pump. In some embodiments, the opacity modifier may be at least one organic and/or inorganic pigment, such as a blue or black pigment, added in the wet-end of the papermaking machine prior to sheet formation in an amount of from about 0.2 to about 30 pounds per ton of dry weight of the fiber, for example from about 2 to about 20, about 5 to about 15, or about 8 to about 12 pounds per ton of dry weight of the fiber. Without wishing to be bound by theory, it is believed that addition of the opacity modifier in the dry-end, after sheet formation, may result in undesirable re-wet and loss of some of the stretch imparted during sheet formation and creping. In contrast, application of the opacity modifier in the wet-end, before the end of sheet formation and creping, preserves that stretch by obviating the need for application in the dry-end.

In some embodiments, where an opacity modifier is added in the wet-end of the papermaking machine prior to sheet formation, a fixative may also be added in an amount of from about 0.2 to about 10 pounds per ton of dry weight of the fiber, for example from about 1 to about 7 or from about 2 to about 5 pounds per ton of dry weight of the fiber. The fixative may be any known fixative known to increase the retention of the opacity modifier in the paper sheet. In some embodiments, the fixative may be a cationic fixative, for example a low to medium molecular weight cationic polymer.

In some embodiments, an opacity modifier may be added in the wet-end of the papermaking machine prior to sheet formation and an opacity modifier may be added as an opacity surface coating following sheet formation.

In some embodiments, the paper sheet may be treated with a water-resistant modifier. The water-resistant modifier can be any substance that will bond to cellulose and also repel a liquid such as water, for example an oleophobe or a hydrophobe. In some embodiments, the water-resistant modifier may comprise one or more of acrylics, waxes, alkenyl ketene dimers (ALKD), alkyl ketene dimers (AKD), alkenyl succinic anhydrides (ASA), fluorochemicals, silicones, hydrophobically modified anionic polymers (HMAP), hydrophobically modified cationic polymers (HMCP), ethylene-acrylic acids (EAA), neutral rosin emulsions, conventional paper sizing agents, and the like. In some embodiments, the water-resistance additive may be acrylic. In some embodiments, the water-resistance additive may be AKD.

In some embodiments, the water-resistant modifier may be applied as a surface coating. The water-resistant surface coating may be applied after sheet formation by any known technique, for example printing, coating, or spraying. In some embodiments, the water-resistant modifier may be applied as a coating on both sides of the sheet. In some embodiments, a water-resistant modifier may be applied as a surface coating in an amount of from about 0.2 to about 20 lbs/ream based on the dry weight of the sheet. In some embodiments, an acrylic containing water-resistant coating may be applied as a surface coating in an amount of from about 1 to about 15 lbs/ream based on the dry weight of the sheet, for example, from about 8 to about 12 lbs/ream.

In some embodiments, the water-resistant modifier may be added in the wet-end of the papermaking machine prior to sheet formation. Such addition of the water-resistant modifier in the wet-end results in a paper sheet mulch wherein the water-resistant modifier is distributed substantially uniformly throughout the paper sheet mulch product, which does not occur when application is only in the dry-end after sheet formation by, for example, printing, coating, or spraying. In some embodiments, the water-resistant modifier may be added in the headbox. In some embodiments, the water-resistant modifier may be added before the headbox, for example at the stuff box, fan pump, or machine chest pump. In some embodiments, a water-resistant modifier may be added at the machine fan pump. In some embodiments, when applied in the wet-end of the papermaking machine, the water-resistant modifier may be applied in an amount of from about 0.2 to about 30 pounds per ton of dry weight of the fiber, for example, from about 2 to about 20 pounds per ton. In some embodiments, alkyl ketene dimer may be added in the wet-end of the papermaking machine prior to sheet formation as a water-resistant modifier in an amount of from about 1 to about 10 pounds per ton of dry weight of the fiber, for example from about 4 to about 6 pounds per ton of dry weight of the fiber.

In some embodiments, a water-resistant modifier may be added in the wet-end of the papermaking machine prior to sheet formation and a water-resistant modifier may be added as a surface coating following sheet formation.

In some embodiments, one or more wet strength additives may be added to the paper sheet mulch. In some embodiments, the one or more wet strength additives may be added in the wet-end of the papermaking machine prior to sheet formation. Such addition of the wet strength additive in the wet-end results in a paper sheet mulch wherein the wet strength additive is distributed substantially uniformly throughout the paper sheet mulch product, which does not occur when application is only in the dry-end after sheet formation by, for example, printing, coating, or spraying. In some embodiments, the one or more wet strength additives may be added in an amount of from about 0.2 to about 30 pounds per ton of dry weight of the fiber, for example, from about 2 to about 20, or from about 5 to about 10 pounds per ton of dry weight of the fiber. Wet strength additives suitable for use include, but are not limited to, one or more of aliphatic and aromatic aldehydes, urea-formaldehyde resins, melamine formaldehyde resins, polyamide-epichlorohydrin resins, and the like. In one embodiment, the at least one wet strength additive may be a polyamide-epichlorohydrin (PAE) resin, and the like.

In some embodiments, one or more dry strength additives may be added to the paper sheet mulch. In some embodiments, the one or more dry strength additives may be added in the wet-end of the papermaking machine prior to sheet formation. Such addition of the dry strength additive in the wet-end results in a paper sheet mulch wherein the dry strength additive is distributed substantially uniformly throughout the paper sheet mulch product, which does not occur when application is only in the dry-end after sheet formation by, for example, printing, coating, or spraying. In some embodiments, the one or more dry strength additives may be added in an amount of from about 0.2 to about 10 pounds per ton of dry weight of the fiber, for example, from about 0.5 to about 7, or from about 1 to about 4 pounds per ton of dry weight of the fiber. Dry strength additives suitable for use include, but are not limited to, anionic polyacrylamide, carboxymethylcellulose, ethylene-maleamic acid copolymer, acrylamide-maleic acid copolymer, starch, guar gum, cationic guar gum, cationic starch, cationic polyacrylamide, poly-DADMAC, cationic polyacrylates, anionic starch, cationic latex, glyoxylated polyacrylamide, polyamine, cationic PVA, amphoteric dry strength resins, and the like.

In some embodiments, the paper sheet mulch products of the present disclosure may have a basis weight of from about 20 lb/3000 ft$^2$ to about 50 lb/3000 ft$^2$, for example, from about 25 lb/3000 ft$^2$ to about 45 lb/3000 ft$^2$, or from about 30 lb/3000 ft$^2$ to about 40 lb/3000 ft$^2$. Basis weight may be measured according to Tappi T410.

In some embodiments, the paper sheet mulch products of the present disclosure may have a caliper of from about 3 mils/1 sht to about 10 mils/1 sht, for example, from about 4 mils/1 sht to about 8 mils/1 sht. Caliper may be determined by Tappi T411.

In some embodiments, the paper sheet mulch products of the present disclosure may have a machine-direction tensile strength (Tensile MD) of at least about 5 lb/1 in, for example, at least about 10 lb/1 in, or from about 5 lb/1 in to about 20 lb/1 in, or from about 6 lb/1 in to about 13 lb/1 in. In some embodiments, the paper sheet mulch products of the present disclosure may have a cross machine-direction tensile strength (Tensile CD) of at least about 2 lb/1 in, for example, at least about 5 lb/1 in, or from about 2 lb/1 in to about 10 lb/1 in, or from about 3 lb/1 in to about 8 lb/1 in. Tensile MD and Tensile CD may be determined according to Tappi TM-494.

In some embodiments, the paper sheet mulch products may have a machine-direction stretch (Stretch MD) of at least about 1%, for example, at least about 5%, at least about 8%, or at least about 10%, or from about 1% to about 30%, for example, from about 5% to about 20%, or from about 10% to about 20%. In some embodiments, the paper sheet mulch products of the present disclosure may have a cross machine-direction stretch (Stretch CD) of at least about 1%, for example, at least about 3%, at least about 5%, or at least about 10%, or from about 1% to about 30%, for example, from about 3% to about 20%. In some embodiments where wrinkles or pleated folds have been imparted to the paper sheet mulch products, the cross-machine direction stretch may be from about 10% to about 20%, for example, from about 13% to about 17%. Stretch MD and Stretch CD may be determined according to Tappi TM-576

In some embodiments, the paper sheet mulch products may have a machine-direction tensile energy absorption (MD TEA) of at least about 2 mm-g/mm$^2$, for example, at least about 3 mm-g/mm$^2$, at least about 5 mm-g/mm$^2$, or at least about 7 mm-g/mm$^2$, or from about 3 mm-g/mm$^2$ to about 10 mm-g/mm$^2$, or from about 5 mm-g/mm$^2$ to about 8 mm-g/mm$^2$. MD TEA may be determined according to Tappi T 576.

In some embodiments, the paper sheet mulch products of the present disclosure may have a machine-direction wet tensile strength (Wet Tensile MD) of at least about 1 lb/1 in, for example, at least about 3 lb/1 in, at least about 5 lb/1 in, or from about 1 lb/1 in to about 7 lb/1 in, or from about 1.5 lb/1 in to about 3 lb/1 in. In some embodiments, the paper sheet mulch products of the present disclosure may have a cross machine-direction wet tensile strength (Wet Tensile CD) of from about 0.5 lb/1 in to about 6 lb/1 in, for example, from about 0.7 lb/1 in to about 2 lb/1 in. Wet Tensile MD and Wet Tensile CD may be determined according to Tappi TM-494.

In some embodiments, the paper sheet mulch products of the present disclosure may have an opacity of at least about 95%, for example, at least about 98%, or about 100%. Opacity may be determined according to TAPPI T425.

In some embodiments, the paper sheet mulch products of the present disclosure may have a 0.1 ml water absorption rate (WAR) of at least about 90 seconds, for example, at least about 200 seconds, at least about 500 seconds, or at least about 1000 seconds. WAR may be determined by Tappi T432.

Contact angle is often used to evaluate the wettability or water resistance of cellulose-based surfaces. In some embodiments, the paper sheet mulch products of the present disclosure may have a contact angle of from about 0° to about 150°. The contact angle may depend on the method by which water resistance is imparted to the sheet. In some embodiments where water resistance is imparted by addition of a water-resistant modifier in the wet-end of a papermaking machine, the contact angle may be less than about 50°, for example, from about 0° to about 20°. In some embodiments where water resistance is imparted by addition of a water-resistant modifier to the surface of the sheet, the contact angle may be greater than about 75°, for example great than about 90°, greater than about 110°, or from about 75° to about 160°, or from about 110° to about 150°. Contact angle may be determined by Tappi T558.

The biodegradation rate of the paper sheet mulches described herein may be evaluated by measuring gaseous carbon generation over time. The biodegradation rate may be measured using a slightly modified version of ASTM method D5988. Paper sheet mulch samples are mixed with defined amounts of soil as in the original ASTM D5988 method to create test samples, which are placed in sealed jars and incubated at a controlled temperature of 40 C for 45 days. Unlike ASTM method D5988, the soil is not adjusted with nitrogen to achieve a designated Carbon to nitrogen ratio. Reference samples consisting of only the defined amount of soil are similarly prepared and incubated for 45 days. After 45 days, the $CO_2$ generated by each of the test samples and the reference samples are measured. The biodegradation rate may be inferred from the amount of $CO_2$ generated by a test sample minus the amount of $CO_2$ generated by its corresponding reference sample. In some embodiments, the paper sheet mulch products described herein may have a biodegradation rate according to this test method of from about 50 mg to about 800 mg of $CO_2$ in 45 days, from about 100 mg to about 700 mg of $CO_2$ in 45 days, for example, or from about 200 mg to about 600 mg of $CO_2$ in 45 days.

In some embodiments, the paper sheet mulch products of the present disclosure may have a Gurley Porosity of from about 1 s/100 cm$^3$ to about 100 s/100 cm$^3$. Gurley Porosity may be determined by Tappi T460.

It will be understood that various modifications may be made without departing from the spirit and scope of the disclosure.

Example 1

Single-ply paper basesheets were produced at different basis weights using conventional wet press drying methods with wet creping using non-Taurus crepe blades. The basesheets were produced using a furnish of 60% old corrugated container (OCC) fibers and 40% mixed recycled paper fibers (MRF). Process parameters for manufacturing the basesheets are reported in Table 1.

TABLE 1

| Target Basis Weight | 27.5# | 34.0# |
| --- | --- | --- |
| Yankee Speed fpm | 2575 | 2450 |
| AD Speed fpm | 2382 | 2265 |
| Reel Speed fpm | 2422 | 2306 |
| Refiner - North amps | 28 | 28 |
| Refiner - South amps | 25 | 34 |
| Hood Temp WE F | 740 | 800 |
| Hoof Temp DE F | 740 | 800 |
| Yankee Steam psi | 75 | 82 |
| AD Steam psi | 4 | 30 |
| Wet Strength Flow ml/min | 1250 | 1350 |
| Dry Strength Flow ml/min | 1600 | 1600 |
| PVOH ml/min | 455 | 455 |
| Modifier ml/min | 31 | 31 |
| Coating ml/min | 46 | 46 |
| Stock Flow gpm | 915 | 1070 |

Chemicals added to the basesheets in the wet-end of the papermaking process during production are reported in Table 2 as a percentage based on the dry weight of the fiber. Less than 100% of the chemicals added in the wet-end are retained in the final basesheet. For example, it is estimated that only 5% of the Yankee coating package ends up in the final basesheet.

TABLE 2

| Additive Type | Additive | 27.5# | 34.0# |
| --- | --- | --- | --- |
| Wet Strength | polyamide-epichlorohydrin (PAE) resin | 0.35% | 0.34% |
| Dry Strength | glyoxylated polyacrylamide (GPAM) | 0.13% | 0.12% |
| Creping Adhesive | Poly(vinyl alcohol) (PVOH) | 0.02% | 0.02% |
| Creping Modifier | polyolefin and mineral oil | 0.01% | 0.01% |
| Creping Adhesive | polyamide-epichlorohydrin (PAE) resin | 0.01% | 0.01% |

The basesheets were tested for physical properties and then split into two 50.25 inch parent rolls and tested for opacity, WAR (water absorption), and contact angle (water resistance). The results of these tests are reported in Table 3.

TABLE 3

| Sample | | A | B | C | D |
|---|---|---|---|---|---|
| Target Basis Weight | | 27.5# | 27.5# | 34.0# | 34.0# |
| Property | Units | Before Splitting | After Splitting | Before Splitting | After Splitting |
| Basis Weight | lb/3000 ft2 | 27.8 | | 33.6 | |
| Caliper | mils/8 sht | 56.7 | 52.5 | 55 | 50.9 |
| Stretch MD | % | 10.8 | 9.6 | 10.8 | 9.1 |
| Stretch CD | % | 3.2 | | 4.1 | |
| Tensile CD | g/3 in | 5815 | | 6943 | |
| Tensile MD | g/3 in | 9656 | 9669 | 11001 | 11974 |
| Wet Tensile CD | g/3 in | 2015 | | 2158 | |
| Wet Tensile MD | g/3 in | 3326 | | 3247 | |
| WAR 0.1 | mL sec | 180+ | | 139 | |

TABLE 3-continued

| Sample | | A | B | C | D |
|---|---|---|---|---|---|
| Target Basis Weight | | 27.5# | 27.5# | 34.0# | 34.0# |
| Property | Units | Before Splitting | After Splitting | Before Splitting | After Splitting |
| Contact Angle | degree | 0 | | 0 | |
| Opacity MacBeth | opacity units | 91.2 | | 95.6 | |

The trial produced reels at approximately 27.5 lbs/ream and 34 lbs/ream basis weights. Reducing the caliper and increased smoothness were target properties to improve the final coated sheet. The 34 lbs/ream sheet had lower caliper than the 27.5 lbs/ream sheet. This was attributed to higher sheet moisture at the Yankee and steam in the after dryers. Reel moisture increased from 1.6% on the 27.5 lbs/ream to 2.5% for the 34 lbs/ream.

Paper sheets made with target basis weights of 27.5 and 34 lbs/ream were further coated with a carbon black ink opacity coating and/or an acrylic water-resistance coating. The sheets were tested for certain properties reported in Table 4.

TABLE 4

| Sample | | E | F | G | H |
|---|---|---|---|---|---|
| Target Basis Weight | | 27.5# | 27.5# | 34# | 34# |
| Basis Weight | lb/3000 ft$^2$ | 28.6 | 30.2 | 36.5 | 37.1 |
| Carbon black ink coating | lb/3000 ft$^2$ | 2.0 | 2 | 2.4 | 2.4 |
| Acrylic coating | lb/3000 ft$^2$ | 0 | 1.2 | 0 | 1.1 |
| Caliper | mils/1 sht | 5.3 | 5.4 | 6.4 | 6.4 |
| Tensile MD | lb/1 in | 6.3 | 6.0 | 7.7 | 7.4 |
| Tensile CD | lb/1 in | 3.8 | 4.0 | 5.0 | 4.8 |
| Stretch MD | % | 5.4 | 6.0 | 7.3 | 7.7 |
| Stretch CD | % | 2.6 | 2.6 | 2.8 | 2.7 |
| TEA MD | in-lb/in$^2$ | 0.19 | 0.20 | 0.32 | 0.31 |
| TEA CD | in-lb/in$^2$ | 0.06 | 0.06 | 0.09 | 0.08 |
| Tensile Modulus MD | psi/1000 | 20 | 23 | 22 | 23 |
| Tensile Modulus CD | psi/1000 | 53 | 59 | 55 | 55 |
| Wet Tensile MD | lbf/1 in | 1.9 | 1.9 | 2.3 | 2.3 |
| Wet Tensile CD | lbf/1 in | 1.1 | 1.2 | 1.4 | 1.5 |
| Tear MD | g | 31 | 32 | 40 | 39 |
| Tear CD | g | 37 | 40 | 51 | 56 |
| Gurley Stiffness MD | | 6 | 6 | 10 | 10 |
| Gurley Stiffness CD | | 12 | 12 | 21 | 26 |
| Trapezoidal MD Tensile | gf | 906 | 911 | 1844 | 2313 |
| Trapezoidal MD Elongation | % | 7.6 | 6.5 | 9.2 | 10.1 |
| Trapezoidal MD Energy | gf-mm | 1702 | 1735 | 4764 | 6344 |
| Opacity MacBeth | Opacity units | 96.3 | 96.3 | 97.7 | 98.3 |
| WAR (0.1 ml) | s | 176 | 180+ | 135 | 157 |
| Contact Angle | degrees | 0 | 0 | 0 | 0 |
| Gurley Porosity | s/100 cm$^3$ | 1.1 | 1.4 | 1.6 | 1.7 |

Example 2

A second trial was conducted, with the goal of improving certain properties of the paper sheet mulch products, including sheet toughness (the combination of strength and stretch) and biodegradation rate. Single-ply paper basesheets were produced on a pilot scale paper making machine to target basis weights of 30 lb/3000 ft$^2$ and 40 lb/3000 ft$^2$ using conventional wet press drying methods. The basesheets were produced using a furnish of 100% mixed recycled paper fibers (MRF).

Chemicals added to the basesheets in the wet-end of the papermaking process during production are reported in Tables 5 and 6 as pounds per ton based on the dry weight of the fiber. The type of creoina blade used is also reported.

TABLE 5

| Additive Type | Additive |
|---|---|
| Wet Strength | polyamide-epichlorohydrin (PAE) resin |
| Pigment (Blue) | phthalocyanine copper complex |
| Pigment (Black) | carbon black |
| Fixative | cationic polymer |
| Size | alkyl ketene dimer (AKD) |

TABLE 6

| Sample | Target Basis Weight | Wet Strength lbs/ton | Pigment Type @ lbs/ton | Fixative lbs/ton | Size lbs/ton | Crepe Blade |
|---|---|---|---|---|---|---|
| I | 40 | 7 | Blue @ 10 | 3 | 0 | Non-Taurus 10° bevel |
| J | 30 | 7 | Blue @ 10 | 3 | 0 | Non-Taurus 10° bevel |
| K | 40 | 7 | Black @ 10 | 3 | 5 | Non-Taurus 10° bevel |
| L | 40 | 7 | Black @ 10 | 3 | 0 | Non-Taurus 10° bevel |
| M | 30 | 7 | Black @ 10 | 3 | 0 | Non-Taurus 10° bevel |

The Yankee dryer was run at a speed of 75 fpm and the reel at a speed of 69 fpm. A polyolefin and mineral oil creping modifier was added at 4 mg/m$^2$ and a PAE creping adhesive was added at 50 mg/m$^2$.

Basesheet Samples I-M were tested for physical properties and compared with Sample C from Example 1, as reported in Table 7.

TABLE 7

| Sample | I | J | K | L | M | C |
|---|---|---|---|---|---|---|
| Target Basis Weight | 40# | 30# | 40# | 40# | 30# | 34# |
| Pigment Type | Blue | Blue | Black | Black | Black | None |
| Size Added | No | No | Yes | No | No | No |
| Basis Weight (lb/3000 ft^2) | 38.9 | 30.9 | 40.7 | 39.3 | 30.1 | 33.6 |
| Caliper (mils/1sht) | 11.3 | 10.1 | 14.0 | 11.5 | 12.6 | 6.9 |
| Tensile MD (lb/1 in) | 3.3 | 2.8 | 4.9 | 4.5 | 2.6 | 7.2 |
| Tensile CD (lb/1 in) | 1.5 | 1.2 | 1.9 | 2.0 | 1.7 | 4.6 |
| Stretch MD (%) | 13.4 | 10.8 | 10.8 | 11.8 | 14.0 | 10.8 |
| Stretch CD (%) | 3.4 | 3.8 | 2.9 | 3.5 | 2.7 | 4.1 |
| TEA MD (mm-g/mm^2) | 2.89 | 2.00 | 3.34 | 3.89 | 2.31 | 7.16 |
| TEA CD (mm-g/mm^2) | 0.58 | 0.50 | 0.60 | 0.74 | 0.39 | 1.92 |
| Wet Tensile MD (lbf/1 in) | 0.5 | 0.3 | 1.2 | 1.1 | 0.9 | 1.7 |
| Wet Tensile CD (lbf/1 in) | 0.2 | 0.2 | 0.5 | 0.5 | 0.5 | 1.0 |
| Tear MD (g) | 24.1 | 20.1 | 28.9 | 34.8 | 30.6 | na |
| Tear CD (g) | 22.9 | 21.6 | 40.6 | 37.5 | 29.5 | na |
| Trapezoidal Tensile (g) | 973 | 685 | 1087 | 1330 | 877 | 2311 |
| Trapezoidal Stretch (%) | 17.9 | 13.5 | 15.7 | 17.4 | 18.2 | 19.8 |
| Trapezoidal Energy (g-mm) | 3583 | 1897 | 3055 | 4711 | 2626 | 7426 |
| Opacity MacBeth (%) | 99.9 | 98.5 | 100.0 | 100.5 | 99.9 | 95.6 |
| WAR (sec) | 9 | 14 | 180+ | 12 | 28 | 93 |
| Contact Angle (deg) | 0 | 0 | 119 | 0 | 0 | 0 |

The addition of both pigments (blue, black) was found to impart an opacity of 98+% at both the target basis weights of 30 lb/3000 ft$^2$ and 40 lb/3000 ft$^2$.

The addition of an opacity modifier pigment in the wet-end of the paper machine in Example 2 resulted in increased stretch (important for sheet toughness), as compared to the samples where an opacity modifier ink was added in the dry end during converting as in in Example 1 (Sample E-H). Without wishing to be bound by theory, it is believed that addition of the opacity modifier ink in the dry end during converting results in the introduction of moisture to the sheet that causes the crepe to relax stretch to undesirably decrease.

Compared to the basesheets produced in Example 1, the basesheets of Example 2 had wet and dry strengths reduced by about one half. This is likely due to the combined effects of a variety of factors, including the change in furnish (the use of OCC as in Example 1 is believed to result in increased strength) and the fact that the basesheets of Example 2 were made on a pilot dry crepe machine instead of a full-scale wet crepe machine.

The addition of a size additive (AKD) in Sample K was also found to have the desired effect of increasing contact angle and therefore inhibiting penetration of water into the sheet.

Basesheet Samples I-M were further tested for biodegradation rate by analyzing CO$_2$ generation and compared with Samples F and H from Example 1, as reported in Tables 8 and 9. A lower biodegradation rate indicates a lower amount of CO$_2$ reacted after 45 days, which indicates a slower (beneficial) biodegradation rate.

TABLE 8

| Sample | | Biodegradation Rate | STD |
|---|---|---|---|
| — | Soil Only | 0 | 56 |
| I | 40# Blue Pigment | 412 | 247 |
| J | 30# Blue Pigment | 624 | 195 |
| K | 40# Black Pigment, Sized | 545 | 390 |
| L | 40# Black Pigment | 607 | 93 |
| M | 30# Black Pigment | 663 | 160 |
| F | 27.5# Black Ink + Acrylic Coating | 678 | 38 |
| H | 34# Black Ink + Acrylic Coating | 715 | 85 |

TABLE 9

| | Treatment | No Treatment | Difference |
|---|---|---|---|
| Effect of Blue Pigment vs. Black Pigment | | | |
| Blue (Sample I) vs. Black (Sample L) | 412 | 607 | −195 |
| Blue (Sample J) vs. Black (Sample M) | 624 | 663 | −39 |
| Effect of Size vs. No Size | | | |
| Sized (Sample K) vs. Unsized (Sample L) | 545 | 607 | −62 |
| Effect of High vs. Low Basis Weight | | | |
| 40# (Sample I) vs. 30# (Sample J) | 412 | 624 | −212 |
| 40# (Sample L) vs. 30# (Sample M) | 607 | 663 | −56 |

The blue pigment, which was based on a phthalocyanine copper complex, yielded somewhat lower levels of CO$_2$ than did the black (carbon black) pigment. Both pigments are alkaline. Without wishing to be bound by theory, it is believed that this may be due, in part, to the presence of copper in the blue pigment, which may act to inhibit the growth of microbes that accelerate degradation. Regardless of which pigment is used, it is believed that addition in the wet-end, which distributes the pigment throughout the thickness of the sheet, results in slower biodegradation when compared with the application of the opacity modifier in the dry end following sheet formation. Though the effect is relatively small, it appears that addition of internal size may also contribute to slower biodegradation by hindering the movement of water into the mulch structure, which is needed for some microbial growth. The results of the present experiment appear to also confirm that basesheets with the higher basis weight have beneficially slower biodegradation rates.

Other Inventive Embodiments

Descriptions of the disclosed embodiments are not exhaustive and are not limited to the precise forms or exemplary embodiments disclosed. Modifications and adaptations of the exemplary embodiments will be apparent from consideration of the specification and practice of the disclosed embodiments. It is to be understood that the invention may also be defined in accordance with the following embodiments, which are not necessarily exclusive or limiting of those claimed:

A. A paper sheet mulch product having a machine-direction tensile strength (Tensile MD) of at least about 5 lb/1 in, for example, at least about 10 lb/1 in, or from about 5 lb/1 in to about 20 lb/1 in, or from about 6 lb/1 in to about 13 lb/1 in.

B. A paper sheet mulch product according to embodiment A, further having a machine-direction stretch (Stretch MD) of at least about 1%, for example, at least about 5%, at least about 8%, or at least about 10%, or from about 1% to about 30%, for example, from about 5% to about 20%, or from about 10% to about 20%.

C. A paper sheet mulch product according to embodiments A-B, further having an opacity of at least about 95%, for example, at least about 98%, or about 100%.

D. A paper sheet mulch product according to embodiments A-C, further having a basis weight of from about 20 lb/3000 ft$^2$ to about 50 lb/3000 ft$^2$, for example, from about 25 lb/3000 ft$^2$ to about 45 lb/3000 ft$^2$, or from about 30 lb/3000 ft$^2$ to about 40 lb/3000 ft$^2$.

E. A paper sheet mulch product according to embodiments A-D, further having a caliper of from about 3 mils/1 sht to about 10 mils/1 sht, for example, from about 4 mils/1 sht to about 8 mils/1 sht.

F. A paper sheet mulch product according to embodiments A-E, further having a biodegradation rate according to this test method of from about 50 mg to about 800 mg of $CO_2$ in 45 days, from about 100 mg to about 700 mg of $CO_2$ in 45 days, for example, or from about 200 mg to about 600 mg of $CO_2$ in 45 days.

G. A paper sheet mulch product according to embodiments A-F, further having a machine-direction tensile energy absorption (MD TEA) of at least about 2 mm-g/mm$^2$, for example, at least about 3 mm-g/mm$^2$, at least about 5 mm-g/mm$^2$, or at least about 7 mm-g/mm$^2$, or from about 3 mm-g/mm$^2$ to about 10 mm-g/mm$^2$, or from about 5 mm-g/mm$^2$ to about 8 mm-g/mm$^2$.

H. A paper sheet mulch product according to embodiments A-G, further having a cross machine-direction stretch (Stretch CD) of at least about 1%, for example, at least about 5%, at least about 8%, or at least about 10%, or from about 1% to about 30%, for example, from about 3% to about 20%. In some embodiments where wrinkles or pleated folds have been imparted to the paper sheet mulch products, the cross-machine direction stretch may be from about 10% to about 20%, for example, from about 13% to about 17%.

I. A paper sheet mulch product according to embodiments A-H, further having a cross machine-direction tensile strength (Tensile CD) of at least about 2 lb/1 in, for example, at least about 5 lb/1 in, or from about 2 lb/1 in to about 10 lb/1 in, or from about 3 lb/1 in to about 8 lb/1 in.

J. A paper sheet mulch product according to embodiments A-I, further having a 0.1 ml water absorption rate (WAR) of at least about 90 seconds, for example, at least about 200 seconds, at least about 500 seconds, or at least about 1000 seconds.

K. A paper sheet mulch product according to embodiments A-J, further having a contact angle greater than about 75°, for example great than about 90°, greater than about 110°, or from about 110° to about 150°.

L. A paper sheet mulch product according to embodiments A-J, further having cellulosic fibers comprising an ISO brightness of less than about 80, less than about 70, or less than about 60.

M. A paper sheet mulch product according to embodiments A-J, further having cellulosic fibers comprising a kappa number of at least about 45, at least about 70, at least about 130, or at least about 150, for example from about 45 to about 200, from about 70 to about 180, or from about 130 to about 160.

N. A method of making a paper sheet mulch comprising adding an opacity modifier to obtain at least 95% opacity.

O. A method of making a paper sheet mulch according to embodiment N, wherein the opacity modifier comprises at least one of carbon black and biochar, and is applied as a surface coating after sheet formation in an amount of from about 0.2 to about 20 lbs/ream based on the dry weight of the sheet, for example, from about 1 to about 10 lbs/ream.

P. A method of making a paper sheet mulch according to embodiment N, wherein the opacity modifier comprises at least one organic and/or inorganic pigment, such as a blue or black pigment, and is added in the wet-end of a papermaking machine prior to sheet formation in an amount of from about 0.2 to about 30 pounds per ton of dry weight of the fiber, for example from about 2 to about 20, from about 5 to about 15, or from about 8 to about 12 pounds per ton of dry weight of the fiber.

Q. A method of making a paper sheet mulch according to embodiments N-P, wherein a water-resistant modifier, for example one or more of acrylics, waxes, alkenyl ketene dimers (ALKD), alkyl ketene dimers (AKD), alkenyl succinic anhydrides (ASA), fluorochemicals, silicones, hydrophobically modified anionic polymers (HMAP), hydrophobically modified cationic polymers (HMCP), ethylene-acrylic acids (EAA), and neutral rosin emulsions, is applied as a surface coating after sheet formation in an amount of from about 0.2 to about 20 lbs/ream based on the dry weight of the sheet, for example, from about 1 to about 15 lbs/ream or from about 8 to about 12 lbs/ream.

R. A method of making a paper sheet mulch according to embodiments N-P, wherein a water-resistant modifier, for example one or more of acrylics, waxes, alkenyl ketene dimers (ALKD), alkyl ketene dimers (AKD), alkenyl succinic anhydrides (ASA), fluorochemicals, silicones, hydrophobically modified anionic polymers (HMAP), hydrophobically modified cationic polymers (HMCP), ethylene-acrylic acids (EAA), and neutral rosin emulsions, is added in the wet-end of a papermaking machine prior to sheet formation in an amount of from about 0.2 to about 30 pounds per ton of dry weight of the fiber, for example, from about 2 to about 20 pounds per ton, from about 1 to about 10 pounds per ton of dry weight of the fiber, or from about 4 to about 6 pounds per ton of dry weight of the fiber.

S. A method of making a paper sheet mulch according to embodiments N-R, wherein a wet strength additive, for example one or more of aliphatic and aromatic aldehydes, urea-formaldehyde resins, melamine formaldehyde resins, and polyamide-epichlorohydrin resins, is added in the wet-end of the papermaking machine prior to sheet formation in an amount of from about 0.2 to about 30 pounds per ton of dry weight of the fiber, for example, from about 2 to about 20, or from about 5 to about 10 pounds per ton of dry weight of the fiber.

T. A method of making a paper sheet mulch according to embodiments N-S, wherein a dry strength additive, for example one or more of anionic polyacrylamide, carboxymethylcellulose, ethylene-maleamic acid copolymer, acrylamide-maleic acid copolymer, starch, guar gum, cationic guar gum, cationic starch, cationic polyacrylamide, poly-DADMAC, cationic polyacrylates, anionic starch, cationic latex, glyoxylated polyacrylamide, polyamine, cationic PVA, and amphoteric dry strength resins, is added in the wet-end of the papermaking machine prior to sheet formation in an amount of from about 0.2 to about 10 pounds per ton of dry weight of the fiber, for example, from about 0.5 to about 7, or from about 1 to about 4 pounds per ton of dry weight of the fiber.

U. A method of making a paper sheet mulch according to embodiments N-T, wherein the paper sheet mulch is manufactured using a through-air-drying ("TAD") method.

V. A method of making a paper sheet mulch according to embodiments N-T, wherein the paper sheet mulch is manufactured using conventional a wet pressing ("CWP") method including drying the sheet on the surface of a Yankee cylinder.

W. A method of making a paper sheet mulch according to embodiments N-T and V, wherein the paper sheet is creped from the Yankee dryer in a wet creping process, wherein the sheet is creped at a moisture level of from about 8% to about 12% of the dry weight of the sheet.

X. A method of making a paper sheet mulch according to embodiments N-T and V, wherein the paper sheet is creped from the Yankee dryer in a dry creping process, wherein the sheet is creped at a moisture level of from about 3% to about 5% of the dry weight of the sheet.

Y. A method of making a paper sheet mulch according to embodiments N-X, wherein wrinkles are imparted to the sheet during converting in a direction between about 30° and about 90° from the cross-machine direction, for example, between about 60° and about 90°, for example with a bowed roll or a roll with annular rings.

Z. A method of making a paper sheet mulch according to embodiments N-Y, wherein pleated folds are imparted to the sheet during converting in a direction between about 30° and about 90° from the cross-machine direction, for example, between about 60° and about 90°, for example during a rewinding operation by running the sheet over folding boards or plows to impart one or more folds in the sheet, and then directing the sheet through one or more pressing nips to fix the pleated folds into place.

We claim:

1. A paper sheet mulch comprising:
at least about 75% cellulosic papermaking fibers based on the dry weight of the sheet, a basis weight of from about 25 lb/3000 ft$^2$ to about 45 lb/3000 ft$^2$, a machine-direction stretch of from about 10% to about 20%, and a machine-direction tensile strength of from about 6 lb/1 in to about 13 lb/1 in;
wherein the paper sheet comprises at least one opacity modifier comprising one or more of carbon black, biochar, a pigment, a dye, clay, kaolin, titanium oxide, and combinations thereof; wherein the at least one opacity modifier is distributed substantially uniformly throughout the sheet; and wherein the opacity modifier is present in the paper sheet in an amount sufficient to impart an opacity of at least 95% to the paper sheet.

2. The paper sheet mulch of claim 1, comprising a machine-direction tensile energy absorption of from about 3 mm-g/mm$^2$ to about 10 mm-g/mm$^2$.

3. The paper sheet mulch of claim 1, comprising from about 75% to 100% recycled cellulosic fibers based on the dry weight of the paper sheet.

4. The paper sheet mulch of claim 3, comprising at least about 50% old corrugated container fibers based on the dry weight of the sheet.

5. The paper sheet mulch of claim 1, comprising a kappa number of at least about 70.

6. The paper sheet mulch of claim 1, comprising from about 75% to 100% cellulosic fibers with an ISO brightness of less than about 80 based on the dry weight of the paper sheet.

7. The paper sheet mulch of claim 1, comprising a contact angle with water of at least about 75°.

8. The paper sheet mulch of claim 1, wherein the at least one opacity modifier comprises a black or blue pigment that is distributed substantially uniformly throughout the sheet.

9. The paper sheet mulch of claim 1, wherein the at least one opacity modifier comprises a blue pigment comprising copper.

10. The paper sheet mulch of claim 1, comprising at least one water-resistant modifier comprising one or more of an acrylic, wax, alkenyl ketene dimer (ALKD), alkyl ketene dimer (AKD), alkenyl succinic anhydride (ASA), fluorochemical, silicone, hydrophobically modified anionic polymer (HMAP), hydrophobically modified cationic polymer (HMCP), ethylene-acrylic acid (EAA), neutral rosin emulsion, and combinations thereof, wherein the at least one water-resistant modifier is distributed substantially uniformly throughout the sheet.

11. The paper sheet mulch of claim 10, wherein the at least one water-resistant modifier comprises one or more of alkenyl ketene dimer (ALKD) and alkyl ketene dimer (AKD).

12. The paper sheet mulch of claim 1, comprising at least one wet strength additive comprising one or more of an aliphatic aldehyde, aromatic aldehyde, urea-formaldehyde resin, melamine formaldehyde resin, polyimide-epichlorohydrin resin, and combinations thereof, wherein at least one wet strength additive is distributed substantially uniformly throughout the sheet.

13. The paper sheet mulch of claim 1, comprising at least one dry strength additive comprising one or more of a starch, guar gum, polyacrylamide, carboxymethyl cellulose, and combinations thereof, wherein at least one dry strength additive is distributed substantially uniformly throughout the sheet.

14. The paper sheet mulch of claim 1, wherein the sheet is single-ply and comprises a caliper of from about 4 mils/1 sht to about 8 mils/1 sht.

15. The paper sheet mulch of claim 1, comprising a cross machine-direction tensile strength of from about 3 lb/1 in to about 8 lb/1 in and a cross machine-direction stretch of from about 3% to about 20%.

16. The paper sheet mulch of claim 1, comprising a 0.1 ml water absorption rate of at least about 90 seconds.

17. The paper sheet mulch of claim 1, comprising biodegradation rate of from about 50 mg to about 800 mg $CO_2$ in 45 days.

18. The paper mulch sheet of claim 1, comprising at least one opacity modifier comprising one or more of a blue or black pigment, at least one water-resistant modifier comprising alkyl ketene dimer, and at least one wet strength additive comprising polyamide-epichlorohydrin resin, wherein the at least one opacity modifier, the at least one water-resistant modifier, and the at least one wet strength additive are distributed substantially uniformly throughout the sheet.

19. The paper mulch sheet of claim 1, comprising at least one of wrinkles or back-and-forth pleated folds that are oriented in a direction between about 30° and about 90° from the cross-machine direction of the paper sheet.

20. The paper sheet mulch of claim 19, comprising a cross machine-direction tensile strength of from about 3 lb/1 in to about 8 lb/1 in and a cross machine-direction stretch of from about 12% to about 17%.

* * * * *